(12) United States Patent
Mukherjee et al.

(10) Patent No.: US 12,293,318 B2
(45) Date of Patent: May 6, 2025

(54) SYSTEM AND METHOD FOR RESOURCE ALLOCATION BASED ON RESOURCE ATTRIBUTES AND ELECTRONIC FEEDBACK

(71) Applicant: BANK OF AMERICA CORPORATION, Charlotte, NC (US)

(72) Inventors: Maharaj Mukherjee, Poughkeepsie, NY (US); Prashant Thakur, Gujarat (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 387 days.

(21) Appl. No.: 17/667,670

(22) Filed: Feb. 9, 2022

(65) Prior Publication Data
US 2023/0252380 A1    Aug. 10, 2023

(51) Int. Cl.
G06Q 10/063       (2023.01)
G06Q 10/0631     (2023.01)
G06Q 10/0639     (2023.01)

(52) U.S. Cl.
CPC . G06Q 10/06315 (2013.01); G06Q 10/06393 (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 6,012,051 A | 1/2000 | Sammon, Jr. et al. | |
| 6,041,311 A | 3/2000 | Chislenko et al. | |
| 6,266,649 B1 | 7/2001 | Linden et al. | |
| 7,634,598 B2 | 12/2009 | Kim et al. | |
| 8,682,918 B2 | 3/2014 | Ramanujam | |
| 10,296,851 B2 | 5/2019 | Klein et al. | |
| 10,296,961 B2 | 5/2019 | Kirkby et al. | |
| 11,074,525 B2 | 7/2021 | Klein et al. | |
| 11,307,037 B1 | 4/2022 | Scheper et al. | |
| 11,507,849 B2 | 11/2022 | Xie | |
| 11,651,412 B2 | 5/2023 | Wilson et al. | |
| 2008/0307316 A1 | 12/2008 | Askey | |
| 2014/0257919 A1* | 9/2014 | Forman | G06Q 30/0201 705/7.29 |
| 2017/0061481 A1* | 3/2017 | Wee | G06Q 30/0201 |
| 2017/0140262 A1 | 5/2017 | Wilson et al. | |
| 2018/0121964 A1* | 5/2018 | Zhang | G06Q 30/0277 |
| 2018/0260853 A1 | 9/2018 | Karatas et al. | |
| 2020/0234220 A1 | 7/2020 | Ma et al. | |

* cited by examiner

*Primary Examiner* — Arif Ullah (74) *Attorney, Agent, or Firm* — Moore & Van Allen PLLC; Nicholas C. Russell (57) ABSTRACT

Systems, computer program products, and methods are described herein for the allocation of resources based on resource attributes and electronic feedback. The present invention may be configured to maintain a database of users, resources, and resource scores; determine resource clusters comprising a group of users with similar resource scores; determine for each user a cluster family, and distribute resources to each user based on the cluster family. The present invention may also be configured to include in the database a list of attribute scores and determine attribute clusters. The present invention may also be configured to determine a similarity between resources and distribute resources based on the similarity between resources.

12 Claims, 4 Drawing Sheets

SYSTEM AND METHOD FOR RESOURCE ALLOCATION BASED ON RESOURCE ATTRIBUTES AND ELECTRONIC FEEDBACK

FIELD OF THE INVENTION

The present invention embraces an electronic system for distributing or allocating resources based on electronic feedback from users and attributes of the resources.

BACKGROUND

Recommendation systems are used to provide suggestions to a user. Generally, these systems are one of two types: content-based or collaborative-based. Both types have their downfalls. Content-based systems require extensive feedback from the user. Collaborative-based systems require a large number of users and data from those users. A system that does not require an extensive user and data library while also using minimal feedback from the user is needed to distribute resources to users effectively.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for resource allocation is presented. The system may include at least one non-transitory storage device and at least one processing device coupled to the at least one non-transitory storage device, where the at least one processing device may be configured to: maintain a database. The database may include a list of resources, a list of users, and a list of resource scores. The resource scores may correspond to a user entry and a resource entry. The at least one processing device may be further configured to determine at least one resource cluster. A resource cluster comprises a group of users with similar resource scores. The at least one processing device may be further configured to determine for each user a cluster family. A cluster family comprises a list of the resource clusters associated with a user. The at least one processing device may be further configured to distribute resources to a user based on the cluster family.

In another aspect, a computer program product for resource allocation is presented. The computer program product may include a non-transitory computer-readable medium including code causing a first apparatus to maintain a database. The database may include a list of resources, a list of users, and a list of resource scores. A resource score may correspond to a user entry and a resource entry. The non-transitory computer readable medium may further include code causing a first apparatus to determine at least one resource cluster. A resource cluster comprises a group of users with similar resource scores. The non-transitory computer readable medium may further include code causing the first apparatus to determine for a user a cluster family. A cluster family comprises a list of resource clusters associated with a user. The non-transitory computer readable medium may further include code causing the first apparatus to distribute resources to the user based on the cluster family.

In yet another aspect, a method for resource allocation is provided. The method may include maintaining a database. The database may include a list of resources, a list of users, and a list of resource scores. A resource score corresponds to a user entry and a resource entry. The method may further include determining resource clusters. A resource cluster includes a group of users with similar resource scores. The method may further include determining for a user a cluster family. A cluster family includes a list of resource clusters associated with a user. The method may further include distributing resources to a user based on the cluster family.

In some embodiments, the resource score is determined by user feedback. In some embodiments the resource score is determined by acquired user data. Additionally, or alternatively, the resource score is determined by both user feedback and acquired user data.

In some embodiments the database further comprises a list of attribute scores for each resource. The attribute score corresponds to a user and a resource. In some embodiments, the attribute score is determined by user feedback. In some embodiments the attribute score is determined by acquired user data. Additionally, or alternatively. The attribute scores is determined by both user feedback and acquired user data.

In some embodiments, the at least one processing device is further configured to determine an attribute cluster. In some embodiments, the non-transitory computer readable medium may further include code causing the first apparatus to determine an attribute cluster. In some embodiments, the method may further include determining an attribute cluster. An attribute cluster includes a group of users with similar attribute scores. In some embodiments, the cluster family further includes attribute clusters associated with the user.

In some embodiments, the at least one processing device is further configured to a similarity score between a first resource and a second resource. Additionally, or alternatively, the non-transitory computer readable medium may further include code causing the first apparatus to determine a similarity score between a first resource and a second resource. In some embodiments, the method may further include determining a similarity score between a first resource and a second resource.

In some embodiments, the at least one processing device is further configured to distribute resources to the user based on the similarity score. Additionally, or alternatively, the non-transitory computer readable medium further comprises code causing the first apparatus to distribute resources to the user based on the similarity score. In some embodiments, the method may further include distributing resources to the user based on the similarity score.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, the system may be configured to maintain a database, determine clusters and cluster families, and distribute resources based on the user's cluster family and/or the resource attributes. The system may collect minimal feedback from the user. For example, the feedback may consist of only rating the resource on a scale (e.g., on a scale of 1-5, on a smiley-face scale, etc.). For more extensive feedback, the feedback may consist of rating the resource attributes on a scale. The system may collect user feedback, correlate the user feedback with the resources, group users together based on feedback, identify sets of resources based on the groups feedback, and recommend similar resources based on similarity of resources.

The system described herein may be configured to distribute many types of resources and is not limited to the examples listed in this disclosure. In one example, the system may be configured to distribute office locations/workspace to workers. In another example, the system may be configured to distribute food to a group of people. In yet another example, the system may be configured to distribute marketing materials to a user. In yet another example, the system may be configured to recommend content for purchasing and/or consuming to a user.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or the like employing information technology resources for processing large amounts of data. In some embodiments, the entity may be an institution, group, association, financial institution, establishment, company, union, authority, merchant, service provider, and/or the like hosting, sponsoring, coordinating, creating, and/or the like events, recognitions, achievements, and/or the like.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein. In some embodiments, a user may be a verified authority as described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes; and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As used herein, identifiers such as "first," "second," "third," and/or the like do not indicate a temporal relationship, unless explicitly stated. Such identifiers may modify instances of similar things and may be used to differentiate between each of the instances.

As used herein, a "subset" may refer to one or more from a group. For example, a subset of users from a group of users may be one user from the group of users, multiple users from the group of users, or all of the users from the group of users. As another example, a subset of properties may be one property from the properties, multiple properties from the properties, or all of the properties.

Figure 1:
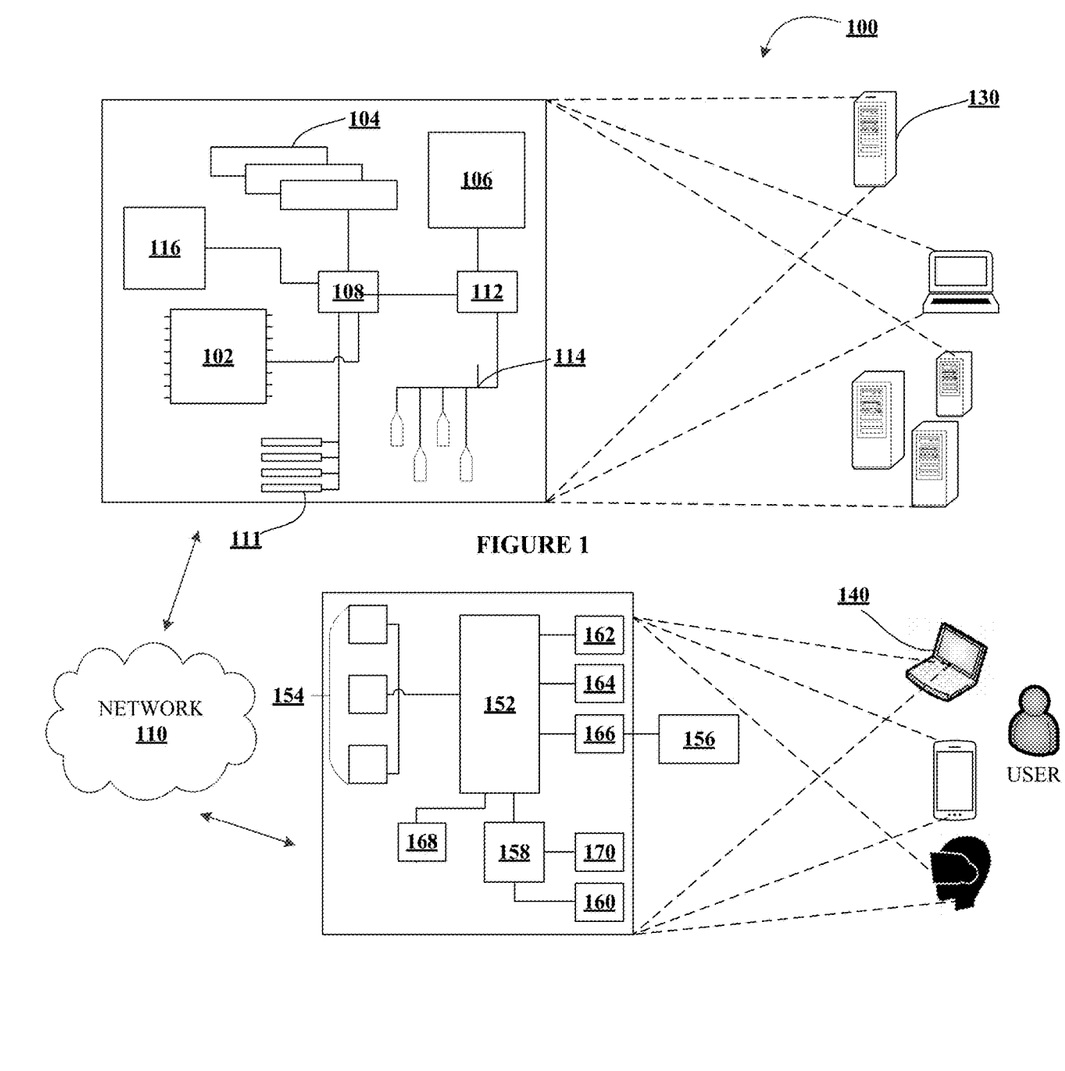
FIG. 1 illustrates technical components of a system for resource allocation, in accordance with an embodiment of the invention.

FIG. 1 presents an exemplary block diagram of a system environment 100 for distributing and/or allocating resources, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for distributing and/or allocating resources to users, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like.

The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more resource allocation systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to provide user feedback and user data using one or more systems, applications, services, and/or the like (e.g., similar to the system 130, running a system similar to the system 130, and/or the like) and the user input system may provide information (feedback, preferences, allergies, sensitivities, etc.) to a resource allocation system (e.g., similar to the system 130, running a system similar to the system 130, and/or the like). In some embodiments, the resource allocation system associated with the entity may perform one or more of the steps described herein with respect to the process flows described herein with respect to FIGS. 2, 3, and/or 4.

Figure 2:
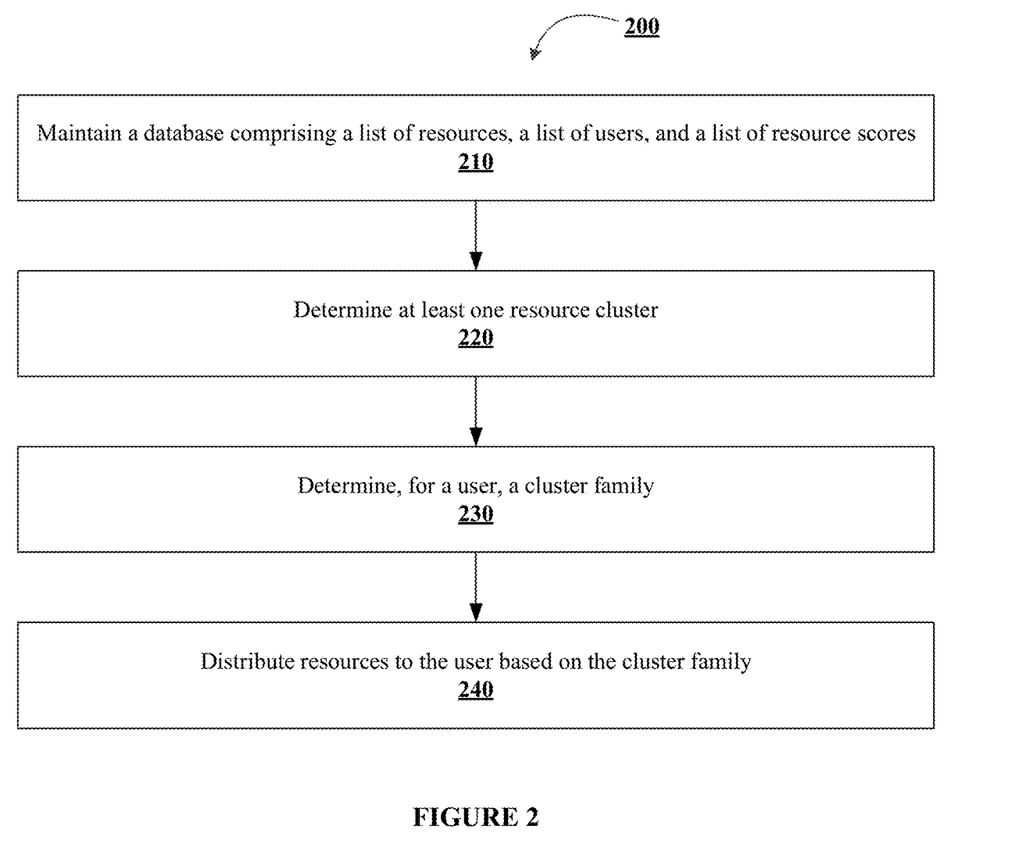
FIG. 2 illustrates a process flow for resource allocation, in accordance with an embodiment of the invention.

FIG. 2 illustrates a process flow 200 for resource allocation, in accordance with an embodiment of the invention. In some embodiments, resource allocation and/or the like (e.g.

similar to one or more of the systems described herein with respect to FIG. 1) may perform one or more of the steps of process flow 200.

As shown in block 210, the process flow 200 may include maintaining a database. The database may include a list of resources, a list of users, and a list of resource scores corresponding to a user entry and a resource entry. In some embodiments, the database is stored or represented as a table with the user entries on one axis and the resource entries on the opposite axis.

As shown in block 220, the process flow 200 may include determining at least one resource cluster. The resource cluster may be a group of users with similar resource scores. In some embodiments, users with similar resource scores are determined using a trained machine learning algorithm to group the users into a cluster, or resource cluster. Additionally, or alternatively, users with similar resource scores are determined using an optimized distance metric learning algorithm to group the users into a cluster, or resource cluster. In some embodiments, a user may be in more than one resource cluster.

As shown in block 230, the process flow 200 may include determining, for a user, a cluster family. In some embodiments, the cluster family is a compilation of the clusters, such as resource clusters, that a user is grouped into.

As shown in block 240, the process flow 200 may include distributing resources to the user based on the cluster family. In some embodiments, the user may be distributed a resource that another user with a similar cluster family ranked highly and/or have a corresponding high resource score. Additionally, or alternatively, the user may be distributed a resource that other users in the same resource cluster ranked highly and/or have a corresponding high resource score.

Process flow 200 may include additional embodiments, such as any single embodiment or any combination of embodiments described below and/or in connection with one or more other processes described elsewhere herein.

In a first embodiment, the resource score is determined by user feedback. User feedback may be received from providing the user a platform to rank resources. In some embodiments, the user provides feedback by ranking the resource on a scale (a numeric scale, a smiley face scale, etc). Additionally, or alternatively, the user may provide feedback in the form of a review, wherein the review contains details about various attributes of the resource.

In a second embodiment alone or in combination with the first embodiment, the resource score is determined by acquired user data. In some embodiments, the acquired user data may be received from a questionnaire. Additionally, or alternatively, the acquired data may be received from a user data file stored on the database or a connected database.

In a third embodiment, alone or in combination with the first through second embodiments, the user may provide feedback via a user interface of a user input system. Accordingly, the user may provide the acquired user data via the user interface of the user input system.

In a fourth embodiment, alone or in combination with any one of the first through third embodiments, the resource(s) is distributed to the user via a resource distribution instrument.

In a fifth embodiment, alone or in combination with any one of the first through fourth embodiments, the database is stored on the memory 104 of the system 130. Additionally, or alternatively, the database may be stored on a storage device 106.

In a sixth embodiment, alone or in combination with any one of the first through fifth embodiments, the database may be stored on a distributed ledger.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

Figure 3:
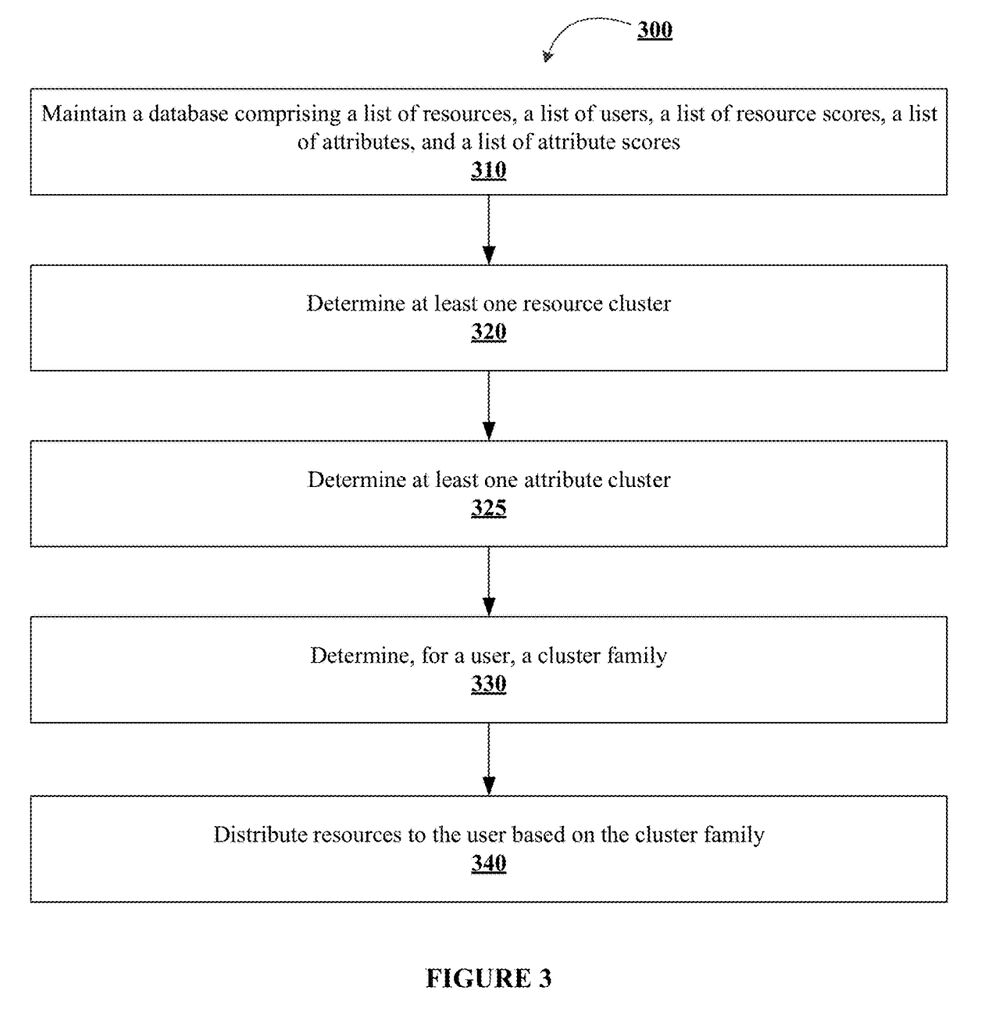
FIG. 3 illustrates a process flow for resource allocation, in accordance with an embodiment of the invention.
Figure 4:
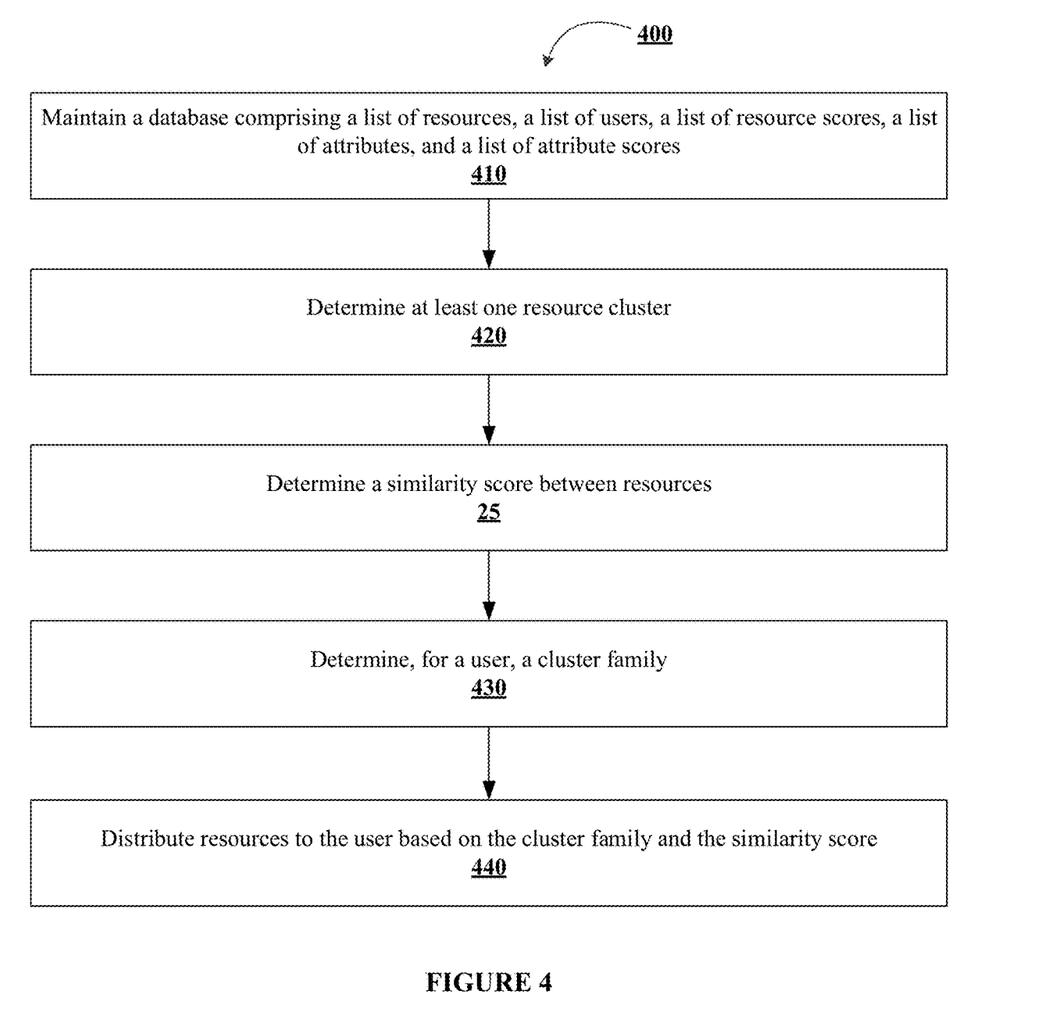
FIG. 4 illustrates a process flow for resource allocation, in accordance with an embodiment of the invention.

FIG. 3 illustrates a process flow 300 for resource allocation, in accordance with an embodiment of the invention. In some embodiments, the resource allocation system and/or the like (e.g., similar to one or more of the systems described herein with respect to FIG. 1) may perform one or more of the steps of process flow 300.

As shown in block 310, the process flow 300 may include maintaining a database. The database may include a list of resources, a list of users, a list of resource scores, and a list of attribute scores corresponding to a user entry and a resource attribute entry. In some embodiments, the database is stored or represented as a table with the user entries on one axis and the resource and attribute entries on the opposite axis. A resource attribute may be any descriptor for a resource.

As shown in block 320 the process flow 300 may include determining at least one resource cluster. The resource cluster may be a group of users with similar resource scores. In some embodiments, users with similar resource scores are determined using a trained machine learning algorithm to group the users into a cluster, or resource cluster. Additionally, or alternatively, users with similar resource scores are determined using an optimized distance metric learning algorithm to group the users into a cluster, or resource cluster.

As shown in block 325, the process flow 300 may include determining at least one attribute cluster. The attribute cluster may be a group of users with similar attribute scores. In some embodiments, users with similar attribute scores are determined using a trained machine learning algorithm to group the users into a cluster, or attribute cluster. Additionally, or alternatively, users with similar attribute scores are determined using an optimized distance metric learning algorithm to group the users into a cluster, or attribute cluster. In some embodiments, the user may be in more than one attribute cluster.

As shown in block 330, the process flow 300 may include determining, for a user, a cluster family. In some embodiments, the cluster family is a compilation of the clusters, such as resource clusters and attribute clusters, that a user belongs to.

As shown in block 340, the process flow 300 may include distributing resources to the user based on the cluster family. In some embodiments, the user may be distributed a resource that another user with a similar cluster family ranked highly.

Process flow 300 may include additional embodiments, such as any single embodiment or any combination of embodiments described below and/or in connection with one or more other processes described elsewhere herein.

In a first embodiment, the process flow 300 may include, the attribute score is determined by user feedback. User feedback may be received from providing the user a platform to rank resources. In some embodiments, the user provides feedback by ranking the resource on a scale (a numeric scale, a smiley face scale, etc). Additionally, or alternatively, the user may provide feedback in the form of a review, wherein the review contains details about various attributes of the resource.

In a second embodiment alone or in combination with the first embodiment, the attribute score is determined by acquired user data. In some embodiments, the acquired user data may be received from a questionnaire. Additionally, or alternatively, the acquired data may be received from a user data file stored on the database or a connected database.

In a third embodiment alone or in combination with any one of first or second embodiments, users may be clustered based on other factors. For example, users may be clustered based on similar interests. As another example, users may be clustered based on economics. As another example, users may be clustered based on job title.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

FIG. 4 illustrates a process flow 400 for resource allocation, in accordance with an embodiment of the invention. In some embodiments, resource allocation system and/or the like (e.g. similar to one or more of the systems described herein with respect to FIG. 1) may perform one or more of the steps of process flow 400.

As shown in block 410, the process flow 400 may include maintaining a database. The database may include a list of resources, a list of users, and a list of resource scores corresponding to a user and a resource. In some embodiments, the database further includes a list of attribute scores. In some embodiments, the database is stored or represented as a table with the user entries on one axis and the resource entries on the opposite axis.

As shown in block 420, the process flow 400 may include determining at least one resource cluster. The resource cluster may be a group of users with similar resource scores. In some embodiments, users with similar resource scores are determined using a trained machine learning algorithm to group the users into a cluster, or resource cluster. Additionally, or alternatively, users with similar resource scores are determined using an optimized distance metric learning algorithm to group the users into a cluster, or resource cluster.

As shown in block 425, the process flow 400 may include determining a similarity score between multiple resources. In some embodiments, a machine learning algorithm is used to determine the similarity score between resources. Additionally, or alternatively, a distance metric learning algorithm is used to determine the similarity between resources. In some embodiments, the similarity score is determined by comparing resource attributes. Similarity may be determined by comparing resource attributes. In some embodiments, similarity may be determined by comparing resource scores and/or attribute scores.

As shown in block 430, the process flow 400 may include determining, for a user, a cluster family. In some embodiments, the cluster family is a compilation of the clusters, such as resource clusters and attribute clusters, that a user belongs to.

As shown in block 440, the process flow 400 may include distributing resources to a user based on the cluster family and the similarity between multiple resources. In some embodiments, determining similarity between multiple resources may include comparing attributes and/or attribute scores of the resources. Additionally, or alternatively, determining similarity between multiple resources may include comparing resource clusters. In some embodiments, determining similarity between multiple resources may include comparing cluster families.

Process flow 400 may include additional embodiments, such as any single embodiment or any combination of embodiments described below and/or in connection with one or more other processes described elsewhere herein.

Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

While specific examples of resources are used to further describe the present invention, it should be understood that the claimed invention is not limited to the examples described herein.

As an example, in a situation wherein the system is configured for distributing and/or allocating workspaces to users, the system may maintain a database comprising a list of workspaces, a list of users, and a list of workspace scores. The system may determine workspace clusters: a group of users who have high workspace scores for the same offices. The system may determine, for a user, a cluster family: a list of workspace clusters that the user belongs to. The system may user the cluster family to allocate a workspace to the user. Further, the database may include attribute scores. Attribute scores are scores given to each attribute of the workspace. For example, user may provide feedback that the light in a particular workspace is not up to their liking. The system may determine attribute clusters: a group of users with similar attribute scores. For example: a group who prefers the light level in the same workspaces. The attribute cluster may be included in the user's cluster family. The system may also compare workspaces by similarity. For example, workspace 1, 2, 3, and 4 are similar. This information may be used to distribute workspaces to users. In this example, user feedback may be obtained at the end of the workday after they've used a particular workspace. In this example, users may fill out a questionnaire with their workspace and/or attribute preferences.

As another example, in a situation wherein the system is distributing and/or allocation food to users, the system may maintain a database comprising a list of food items, a list of users, and a list of food scores. As another example, in a satiation wherein the system is distributing and/or allocating marketing material to users, the system may maintain a database comprising a list of marketing material, a list of users, and a list of market scores. As another example, in a situation wherein the system is distributing and/or allocating content for purchasing or consuming to a user, the system may maintain a database comprising a list of content, a list of users, and a list of content scores.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for resource allocation, the system comprising at least one device configured to obtain attribute data for attributes of office workspaces;
    at least one non-transitory storage device comprising volatile memory and non-volatile memory; and
    at least one processing device coupled to the at least one non-transitory storage device, wherein the at least one processing device is configured to:
    maintain a database, wherein the database comprises (i) a list of resources comprising a list of the office workspaces, (ii) a list of users comprising a list of employees, (iii) a list user feedback corresponding to a user and a resource, (iv) a list of attributes and (v) a corresponding list of attribute feedback corresponding to a user in the list of users and an attribute in the list

19 of attributes, wherein each user feedback of the list of user feedback and each attribute feedback of the list of attribute feedback is received, via a user interface of a user system, from a user of the list of users;

determine at least one resource cluster comprising a subset of the list of users that correspond to a resource of the list of resources, wherein determining a first resource cluster of the at least one resource cluster further comprises:

mapping, using a machine learning algorithm, a first subset of the list of users, such that the user feedback of each of the users in the first subset matches a first resource of the list of resources;

constructing the first resource cluster comprising the first subset of the list of users; and storing the first resource cluster in the database;

determine at least one attribute cluster, wherein determining a first attribute cluster of the at least one attribute cluster comprises:

mapping, using the machine learning algorithm, a second subset of the list of users from the database, wherein the attribute feedback and attribute data that corresponds to a first attribute from the list of attributes and corresponds to each user in the second subset of the list of users;

constructing the first attribute cluster comprising the second subset of the list of users; and storing the first attribute cluster in the database, determine, for each user of the list of users, a cluster family, wherein the cluster family comprises the at least one resource cluster that is associated with the user and the at least one attribute cluster that is associated with the user, wherein determining the cluster family for a first user of the list of users comprises:

mapping one or more first resource clusters of the at least one resource cluster to the first user, wherein each of the one or more first resource clusters comprises the first user;

constructing a first subset of the list of resources, wherein each resource in the first subset of the list of resources corresponds to the one or more resource clusters;

constructing the cluster family for the first user comprising the first subset of the list of resources; and storing the cluster family associated with the first user in the database; and distribute resources to each user of the list of users based on the cluster family, wherein distributing resources comprises assigning, to each user in the list of users, a resource from the cluster family associated with the user, wherein determining (i) the at least one resource cluster (ii) the at least one attribute cluster and (iii) the cluster family for each user in the list of users provides for dynamically utilizing the volatile memory over the non-volatile memory by storing information using in the mapping and the constructing in the volatile memory, thereby reducing a load on the system and increasing a processing speed of the at least one processing device;

dynamically allocating and de-allocating the volatile memory over the non-volatile memory by storing information using in the mapping and the constructing in the volatile memory, thereby reducing a load on the system and increasing a processing speed of the at least one processing device.

20

2. The system for resource allocation according to claim 1, wherein the user feedback further comprises user data retrieved from a connected database.

3. The system for resource allocation according to claim 1, wherein the at least one processing device is further configured to determine at least one similar attribute between a plurality of resources of the list of resources.

4. The system for resource allocation according to claim 3, wherein the at least one processing device is further configured to distribute resources to each user of the list of users based on the at least one similar attribute between the plurality of resources of the list of resources.

5. A computer program product for resource allocation, the computer program product comprising a non-transitory computer-readable medium comprising code causing a first apparatus to:

maintain a database, wherein the database comprises (i) a list of resources comprising a list of office workspaces, (ii) a list of users comprising a list of employees, (iii) a list of user feedback corresponding to a user and a resource, (iv) a list of attributes and (v) a corresponding list of attribute feedback corresponding to a user in the list of users and an attribute in the list of attributes, wherein each user feedback of the list of user feedback and each attribute feedback of the list of attribute feedback is received, via a user interface of a user system, from a user of the list of users;

determine at least one resource cluster comprising a subset of the list of users that correspond to a resource of the list of resources, wherein determining a first resource cluster of the at least one resource cluster further comprises:

mapping, using a machine learning algorithm, a first subset of the list of users, such that the user feedback of each of the users in the first subset matches a first resource of the list of resources;

constructing the first resource cluster comprising the first subset of the list of users; and storing the first resource cluster in the database;

determine at least one attribute cluster, wherein determining a first attribute cluster of the at least one attribute cluster comprises:

mapping, using the machine learning algorithm, a second subset of the list of users from the database, wherein the attribute feedback and attribute data that corresponds to a first attribute from the list of attributes and corresponds to each user in the second subset of the list of users, wherein the attribute is received from devices configured to obtain the attribute data for attribute of the office workspace;

constructing the first attribute cluster comprising the second subset of the list of users; and storing the first attribute cluster in the database;

determine, for each user of the list of users, a cluster family, wherein the cluster family comprises the at least one resource cluster that is associated with the user and the at least one attribute cluster that is associated with the user, wherein determining the cluster family for a first user of the list of users comprises:

mapping one or more first resource clusters of the at least one resource cluster to the first user, wherein each of the one or more first resource clusters comprises the first user;

constructing a first subset of the list of resources, wherein each resource in the first subset of the list of resources corresponds to the one or more resource clusters;

constructing the cluster family for the first user comprising the first subset of the list of resources; and storing the cluster family associated with the first user in the database; and distribute resources to each user of the list of users based on the cluster family, wherein distributing resources comprises assigning, to each user in the list of users, a resource from the cluster family associated with the user, wherein determining (i) the at least one resource cluster (ii) the at least one attribute cluster and (iii) the cluster family for each user in the list of users provides for dynamically utilizing volatile memory over non-volatile memory by storing information used in the mapping and the constructing in the volatile memory, thereby reducing a load on at least one processing device and increasing a processing speed of the at least one processing device.

6. The computer program product for resource allocation according to claim 5, wherein user feedback further comprises user data retrieved from a connected database.

7. The computer program product for resource allocation according to claim 5, wherein the non-transitory computer-readable medium further comprises code causing the first apparatus to determine at least one similar attribute between a plurality of resources of the list of resources.

8. The computer program product for resource allocation according to claim 7, wherein the non-transitory computer-readable medium further comprises code causing the first apparatus to distribute resources to each user of the list of users based on the at least one similar attribute between the plurality of resources of the list of resources.

9. A method for resource allocation, the method comprising:

maintaining a database, wherein the database comprises (i) a list of resources comprising a list of office workspaces, (ii) a list of users comprising a list of employees, (iii) a list of user feedback corresponding to a user and a resource, (iv) a list of attributes and (v) a corresponding list of attribute feedback corresponding to a user in the list of users and an attribute in the list of attributes, wherein each user feedback of the list of user feedback and each attribute feedback of the list of attribute feedback is received, via a user interface of a user system, from a user of the list of users;

determining at least one resource cluster comprising a subset of the list of users that correspond to a resource of the list of resources, wherein determining a first resource cluster of the at least one resource cluster further comprises:

mapping, using a machine learning algorithm, a first subset of the list of users, such that the user feedback of each of the users in the first subset matches a first resource of the list of resources;

constructing the first resource cluster comprising the first subset of the list of users; and storing the first resource cluster in the database;

determining at least one attribute cluster, wherein determining a first attribute cluster of the at least one attribute cluster comprises:

mapping, using the machine learning algorithm, a second subset of the list of users from the database, wherein the attribute feedback and attribute data that corresponds to a first attribute from the list of attributes and corresponds to each user in the second subset of the list of users, wherein the attribute is received from devices configured to obtain the attribute data for attribute of the office workspace;

constructing the first attribute cluster comprising the second subset of the list of users; and storing the first attribute cluster in the database;

determining, for each user of the list of users, a cluster family, wherein the cluster family comprises the at least one resource cluster that is associated with the user and the at least one attribute cluster that is associated with the user, wherein determining the cluster family for a first user of the list of users comprises:

mapping one or more first resource clusters of the at least one resource cluster to the first user, wherein each of the one or more first resource clusters comprises the first user;

constructing a first subset of the list of resources, wherein each resource in the first subset of the list of resources corresponds to the one or more resource clusters;

constructing the cluster family for the first user comprising the first subset of the list of resources; and storing the cluster family associated with the first user in the database; and distributing resources to each user of the list of users based on the cluster family, wherein distributing resources comprises assigning, to each user in the list of users, a resource from the cluster family associated with the user, wherein determining (i) the at least one resource cluster (ii) the at least one attribute cluster and (iii) the cluster family for each user in the list of users provides for dynamically utilizing volatile memory over non-volatile memory by storing information used in the mapping and the constructing in the volatile memory, thereby reducing a load on at least one processing device and increasing a processing speed of the at least one processing device.

10. The method for resource allocation according to claim 9, wherein the user feedback further comprises user data retrieved from a connected database.

11. The method for resource allocation according to claim 9, wherein the method further comprises determining at least one similar attribute between a plurality of resources of the list of resources.

12. The method for resource allocation according to claim 11, wherein the method further comprises distributing resources to each user of the list of users based on the at least one similar attribute between the plurality of resources of the list of resources.

* * * * *